(12) United States Patent
Karube

(10) Patent No.: US 10,942,130 B2
(45) Date of Patent: Mar. 9, 2021

(54) DAMAGE INFORMATION PROCESSING DEVICE AND DAMAGE INFORMATION PROCESSING METHOD

(71) Applicant: FUJIFILM Corporation, Tokyo (JP)

(72) Inventor: Mikihiko Karube, Tokyo (JP)

(73) Assignee: FUJIFILM Corporation, Tokyo (JP)

( * ) Notice: Subject to any disclaimer, the term of this patent is extended or adjusted under 35 U.S.C. 154(b) by 291 days.

(21) Appl. No.: 16/009,673

(22) Filed: Jun. 15, 2018

(65) Prior Publication Data

US 2018/0292329 A1 Oct. 11, 2018

Related U.S. Application Data

(63) Continuation of application No. PCT/JP2016/083191, filed on Nov. 9, 2016.

(30) Foreign Application Priority Data

Dec. 25, 2015 (JP) .............................. JP2015-254976

(51) Int. Cl.
*G01N 21/88* (2006.01)
*G06Q 50/08* (2012.01)
*G06T 7/00* (2017.01)

(52) U.S. Cl.
CPC .......... *G01N 21/8851* (2013.01); *G01N 21/88* (2013.01); *G06Q 50/08* (2013.01);
(Continued)

(58) Field of Classification Search
CPC ............... G01N 21/8851; G01N 21/88; G01N 2021/8887; G06T 7/0004; G06T 2207/30132; G06Q 50/08
See application file for complete search history.

(56) References Cited

U.S. PATENT DOCUMENTS

2008/0195330 A1* 8/2008 Hara ................... G01N 33/383
702/40
2011/0015898 A1* 1/2011 Klippel ............... H04R 29/001
702/185
(Continued)

FOREIGN PATENT DOCUMENTS

CN 103969337 A 8/2014
JP H01-182714 A 7/1989
(Continued)

OTHER PUBLICATIONS

R.S. Adhikari et al ,Image-based retrieval of concrete crack properties for bridge inspection (Year: 2014).*
(Continued)

*Primary Examiner* — Mohammad K Islam
(74) *Attorney, Agent, or Firm* — Studebaker & Brackett PC

(57) ABSTRACT

An information processing device according to an aspect of the present invention includes a damage information acquisition unit that acquires damage information on damage of a structure, a damage vector generation unit that vectorizes the acquired damage information to generate a damage vector, and a hierarchical structure information generation unit that generates hierarchical structure information that is information hierarchically representing a connection relationship between the damage vectors on the basis of the generated damage vector. Since the hierarchical structure information that is information hierarchically representing the connection relationship between damage vectors is generated, it is possible to easily recognize the connection relationship between the damage vectors and to easily perform analysis and/or search of the damage vector through the hierarchical structure information.

14 Claims, 13 Drawing Sheets

(52) U.S. Cl.
CPC .... *G06T 7/0004* (2013.01); *G01N 2021/8887* (2013.01); *G06T 2207/30132* (2013.01)

(56) References Cited

U.S. PATENT DOCUMENTS

| | | | | |
|---|---|---|---|---|
| 2013/0173508 | A1* | 7/2013 | Anayama | G01N 21/892 706/12 |
| 2015/0369752 | A1* | 12/2015 | Honda | G01N 21/9501 356/237.2 |

FOREIGN PATENT DOCUMENTS

| | | |
|---|---|---|
| JP | H03-138775 A | 6/1991 |
| JP | H06-148089 A | 5/1994 |
| JP | 2000-028541 A | 1/2000 |
| JP | 2000-046691 A | 2/2000 |
| JP | 2002-257744 A | 9/2002 |
| JP | 4006007 B2 | 11/2007 |
| JP | 2008-291440 A | 12/2008 |
| JP | 2012-098045 A | 5/2012 |
| JP | 2013-250058 A | 12/2013 |
| JP | 2016-050887 A | 4/2016 |

OTHER PUBLICATIONS

Huang et al, Automatic inspection of pavement cracking distress (Year: 2006).*

Communication pursuant to Article 94(3) EPC issued by the European Patent Office dated Jan. 29, 2020, which corresponds to European Patent Application No. 16 878 177.1-1210 and is related to U.S. Appl. No. 16/009,673.

Qin Zou et al., "CrackTree: Automatic crack detection from pavement images", Pattern Recognition Letters, vol. 33, No. 3, Jul. 12, 2011, pp. 227-238 ISSN: 0167-8655.

I.V. Konovalenko et al., "Error Analysis of an Algorithm for Identifying Thermal Fatigue Cracks", Optoelectronics, Instrumentation and Data Processing, Allerton Press, Inc., vol. 47, No. 4, Oct. 12, 2011, pp. 360-367, ISSN: 8756-6990.

H.-J. Vogel et al., "Studies of crack dynamics in clay soil I. Experimental methods, results, and morphological quantification", Geoderma, vol. 125, Aug. 21, 2004, pp. 203-211, Amsterdam, NL, ISSN: 0016-7061.

Qizi Huangpeng et al., "Automatic Crack Length Measurement of Concrete Structure based on Image Processing", Advanced Materials Research, vol. 1030-1032, Sep. 22, 2014, pp. 728-731, ISSN: 1662-8985, doi: 10.4028/www.scientific.net/AMR.1030-1032.728.

The extended European search report issued by the European Patent Office dated Dec. 19, 2018, which corresponds to European Patent Application No. 16878177.1-1210 and is related to U.S. Appl. No. 16/009,673.

International Search Report issued in PCT/JP2016/083191; dated Jan. 31, 2017.

International Preliminary Report on Patentability and Written Opinion issued in PCT/JP2016/083191; dated Jun. 26, 2018.

An Office Action; "Notice of Reasons for Refusal," mailed by the Japanese Patent Office dated Jul. 28, 2020, which corresponds to Japanese Patent Application No. 2019-148907 and is related to U.S. Appl. No. 16/009,673 with English language translation.

Zou Qin, "Study on Enhancement and Extraction of Low-SNR Pavement Cracks", Ph.D Dissertation, School of Remote Sensing and Information Engineering Wuhan University, Apr. 20, 2012, total 129 pages.

Dengfeng Zhang, "Imaged-Based Crack Detection and Properties Retrieval for Railway Concrete Bridge", Beijing Jiaotong University Master's Degree Thesis, Paper No. 1000411120502, Mar. 2014, total 73 pages.

An Office Action mailed by China National Intellectual Property Administration dated Jun. 12, 2020, which corresponds to Chinese Patent Application No. 201680075328.7 and is related to U.S. Appl. No. 16/009,673 with English language translation.

* cited by examiner

FIG. 9

| VECTOR GROUP ID | IMAGE ID | IMAGE DATA | DATE AND TIME OF ACQUISITION | WIDTH OF IMAGE (pixel) | HEIGHT OF IMAGE (pixel) | NUMBER OF CHANNELS | BIT/PIXEL | RESOLUTION (mm/pixel) | |
|---|---|---|---|---|---|---|---|---|---|
| | | | | | | | | X-DIRECTION | Y-DIRECTION |
| C1 | img_2015-001 | (IMAGE DATA OF img_2015-001) | 12.18.2015 | 5,000 | 3,500 | 3 | 64 | 0.5 | 0.5 |

FIG. 10

| VECTOR GROUP ID | DAMAGE VECTOR INFORMATION ||||||||||||| INSPECTION DATE | REPAIR ||
| --- | --- | --- | --- | --- | --- | --- | --- | --- | --- | --- | --- | --- | --- | --- | --- |
| | VECTOR ID | HIERARCHY (LEVEL) | START POINT || TERMINATION POINT || LENGTH (mm) | WIDTH (mm) | DELETION OPERATION FLAG | ADDITION OPERATION FLAG | PARENT VECTOR ID | SIBLING VECTOR ID | CHILD VECTOR ID | | TYPE | REPAIR DATE |
| | | | POINT NUMBER | COORDINATES | POINT NUMBER | COORDINATES | | | | | | | | | | |
| C1 | C1-1 | LEVEL 1 | P1 | (X1,Y1) | P2 | (X2,Y2) | 100 | 1 | 0 | 0 | - | - | C1-2 C1-3 | 12.18.2015 | R1 | 9.28.2015 |
| | C1-2 | LEVEL 2 | P2 | (X2,Y2) | P3 | (X3,Y3) | 50 | 1 | 0 | 0 | C1-1 | C1-3 | C1-4 | 12.18.2015 | R1 | 9.28.2015 |
| | C1-3 | LEVEL 2 | P2 | (X2,Y2) | P4 | (X4,Y4) | 30 | 0.5 | 0 | 0 | C1-1 | C1-2 | C1-5 C1-6 | 12.18.2015 | R2 | 9.28.2015 |
| | C1-4 | LEVEL 2 | P3 | (X3,Y3) | P5 | (X5,Y5) | 60 | 1 | 0 | 0 | C1-2 | - | - | 12.18.2015 | R2 | 9.28.2015 |
| | C1-5 | LEVEL 3 | P4 | (X4,Y4) | P6 | (X6,Y6) | 25 | 0.1 | 0 | 0 | C1-3 | C1-6 | - | 12.18.2015 | R3 | 9.28.2015 |
| | C1-6 | LEVEL 3 | P4 | (X4,Y4) | P7 | (X7,Y7) | 25 | 0.1 | 0 | 0 | C1-3 | C1-5 | - | 12.18.2015 | R3 | 9.28.2015 |

FIG. 13

| VECTOR GROUP ID | DAMAGE VECTOR INFORMATION ||||||||||||||||
|---|---|---|---|---|---|---|---|---|---|---|---|---|---|---|---|---|
| | VECTOR ID | HIERARCHY (LEVEL) | TYPE | START POINT || TERMINATION POINT || LENGTH (mm) | WIDTH (mm) | DELETION OPERATION FLAG | ADDITION OPERATION FLAG | PARENT VECTOR ID | SIBLING VECTOR ID | CHILD VECTOR ID | INSPECTION DATE | REPAIR ||
| | | | | POINT NUMBER | COORDINATES | POINT NUMBER | COORDINATES | | | | | | | | | TYPE | REPAIR DATE |
| C1 | C1-1 | LEVEL 1 | TRUNK | P1 | (X1,Y1) | P2 | (X2,Y2) | 100 | 1 | 0 | 0 | - | - | C1-2 C1-3 | 12.18.2015 | R1 | 9.28.2015 |
| | C1-2 | LEVEL 1 | TRUNK | P2 | (X2,Y2) | P3 | (X3,Y3) | 50 | 1 | 0 | 0 | C1-1 | C1-3 | C1-4 | 12.18.2015 | R1 | 9.28.2015 |
| | C1-3 | LEVEL 2 | BRANCH | P2 | (X2,Y2) | P4 | (X4,Y4) | 30 | 0.5 | 0 | 0 | C1-1 | C1-2 | C1-5 C1-6 | 12.18.2015 | R2 | 9.28.2015 |
| | C1-4 | LEVEL 1 | TRUNK | P3 | (X3,Y3) | P5 | (X5,Y5) | 60 | 1 | 0 | 0 | C1-2 | - | - | 12.18.2015 | R2 | 9.28.2015 |
| | C1-5 | LEVEL 3 | LEAF | P4 | (X4,Y4) | P6 | (X6,Y6) | 25 | 0.1 | 0 | 0 | C1-3 | C1-6 | - | 12.18.2015 | R3 | 9.28.2015 |
| | C1-6 | LEVEL 3 | LEAF | P4 | (X4,Y4) | P7 | (X7,Y7) | 25 | 0.1 | 0 | 0 | C1-3 | C1-5 | - | 12.18.2015 | R3 | 9.28.2015 |

FIG. 17

| VECTOR GROUP ID | DAMAGE VECTOR INFORMATION | | | | | | | | | | | | | |
|---|---|---|---|---|---|---|---|---|---|---|---|---|---|---|
| | VECTOR ID | HIERARCHY (LEVEL) | START POINT | | TERMINATION POINT | | LENGTH (mm) | WIDTH (mm) | DELETION OPERATION FLAG | ADDITION OPERATION FLAG | PARENT VECTOR ID | SIBLING VECTOR ID | CHILD VECTOR ID | INSPECTION DATE | REPAIR | |
| | | | POINT NUMBER | COORDINATES | POINT NUMBER | COORDINATES | | | | | | | | | TYPE | REPAIR DATE |
| C1 | C1-1 | LEVEL 1 | P1 | (X1,Y1) | P2 | (X2,Y2) | 100 | 1 | 0 | 0 | - | - | C1-2<br>C1-3 | 3.1.2015 | R1 | 9.28.2015 |
| | C1-2 | LEVEL 2 | P2 | (X2,Y2) | P3 | (X3,Y3) | 50 | 1 | 0 | 0 | C1-1 | C1-3 | C1-4 | 6.1.2015 | R1 | 9.28.2015 |
| | C1-3 | LEVEL 2 | P2 | (X2,Y2) | P4 | (X4,Y4) | 30 | 0.5 | 0 | 0 | C1-1 | C1-2 | C1-5<br>C1-6 | 6.1.2015 | R2 | 9.28.2015 |
| | C1-4 | LEVEL 3 | P3 | (X3,Y3) | P5 | (X5,Y5) | 60 | 1 | 0 | 0 | C1-2 | - | - | 9.1.2015 | R2 | 9.28.2015 |
| | C1-5 | LEVEL 3 | P4 | (X4,Y4) | P6 | (X6,Y6) | 25 | 0.1 | 0 | 0 | C1-3 | C1-6 | - | 9.1.2015 | R3 | 9.28.2015 |
| | C1-6 | LEVEL 3 | P4 | (X4,Y4) | P7 | (X7,Y7) | 25 | 0.1 | 0 | 0 | C1-3 | C1-5 | - | 9.1.2015 | R3 | 9.28.2015 |

FIG. 19

| VECTOR GROUP ID | DAMAGE VECTOR INFORMATION ||||||||||||||
| --- | --- | --- | --- | --- | --- | --- | --- | --- | --- | --- | --- | --- | --- | --- |
| | VECTOR ID | HIERARCHY (LEVEL) | START POINT || TERMINATION POINT || LENGTH (mm) | WIDTH (mm) | DELETION OPERATION FLAG | ADDITION OPERATION FLAG | PARENT VECTOR ID | SIBLING VECTOR ID | CHILD VECTOR ID | INSPECTION DATE | REPAIR ||
| | | | POINT NUMBER | COORDINATES | POINT NUMBER | COORDINATES | | | | | | | | | TYPE | REPAIR DATE |
| C2 | C2-1 | LEVEL 1 | P8 | (X8,Y8) | P9 | (X9,Y9) | 100 | 1 | 0 | 0 | - | - | C2-2 | 12.18.2015 | R1 | 9.28.2015 |
| | C2-2 | LEVEL 1 | P9 | (X9,Y9) | P10 | (X10,Y10) | 120 | 1 | 0 | 0 | C2-1 | - | C2-3 | 12.18.2015 | R1 | 9.28.2015 |
| | C2-3 | LEVEL 1 | P10 | (X10,Y10) | P11 | (X11,Y11) | 100 | 0.5 | 0 | 0 | C2-2 | - | C2-4 | 12.18.2015 | R1 | 9.28.2015 |
| | C2-4 | LEVEL 1 | P11 | (X11,Y11) | P12 | (X12,Y12) | 110 | 1 | 0 | 0 | C2-3 | - | - | 12.18.2015 | R1 | 9.28.2015 |

DAMAGE INFORMATION PROCESSING DEVICE AND DAMAGE INFORMATION PROCESSING METHOD

CROSS-REFERENCE TO RELATED APPLICATIONS

The present application is a Continuation of PCT International Application No. PCT/JP2016/083191 filed on Nov. 9, 2016 claiming priority under 35 U.S.C § 119(a) to Japanese Patent Application No. 2015-254976 filed on Dec. 25, 2015. Each of the above applications is hereby expressly incorporated by reference, in their entirety, into the present application.

BACKGROUND OF THE INVENTION

1. Field of the Invention

The present invention relates to a device and method for processing damage of a structure, and more particularly, to a device and method for processing information obtained by vectorizing the damage.

2. Description of the Related Art

Since various types of damage occurs in a structure such as a bridge, a tunnel, a road, or a building and progresses with time, it is necessary to perform repair according to a situation of the damage in order to ensure safety of the structure. In the related art, inspection of the damage has been performed through visual inspection of a worker or inspection using a device, but in recent years, electronic processing is performed by an imaging device and/or an image processing device due to problems such as working time and cost or an environment of a working place.

For example, JP1994-148089A (JP-H06-148089A) describes creating vector data of cracks and assigning information such as a group number, a continuation point, an end point, and a branch point in crack measurement of concrete or the like. In addition, JP2002-257744A describes creating vector data of cracks in defect inspection of a concrete and writing information on intersection of the cracks to a file.

SUMMARY OF THE INVENTION

However, in technologies described in JP1994-148089A (JP-H06-148089A) and JP2002-257744A described above, even in a case where classification of an end point of a damage vector (see JP1994-148089A (JP-H06-148089A)) or classification of patterns (refer to JP2002-257744A) is performed, it is difficult to recognize which of vectors is connected to which of the vectors at which of points in what way (a connection relationship between damage vectors), and as a result, it is difficult to search for, analyze, and evaluate damage.

The present invention has been made in view of the above circumstances, and an object of the present invention is to provide a damage information processing device and a damage information processing method capable of easily recognizing a connection relationship between damage vectors.

In order to achieve the above object, a damage information processing device according to a first aspect of the present invention comprises: a damage information acquisition unit that acquires damage information on damage of a structure; a damage vector generation unit that vectorizes the acquired damage information to generate a damage vector; and a hierarchical structure information generation unit that generates hierarchical structure information that is information hierarchically representing a connection relationship between the damage vectors on the basis of the generated damage vector.

In the damage information processing device according to the first aspect, since the damage information is vectorized to generate the damage vector, and hierarchical structure information that is information hierarchically representing the connection relationship between damage vectors is generated on the basis of the damage vector, it is possible to easily recognize the connection relationship between the damage vectors and to easily perform analysis and/or search of the damage vector through the hierarchical structure information.

In the first aspect, the damage information may be acquired by inputting the image obtained by imaging the structure and performing image processing on the image, or the damage information extracted from the image may be directly acquired. In the first aspect, "hierarchically" means that there is an upper or lower level relationship determined by the connection relationship between the damage vectors. The hierarchy of damage vectors can be determined using various schemes, and the scheme to be used may be determined according to a purpose of analysis and/or evaluation.

In addition, in a case where a plurality of damage vectors are connected to an end point of a certain damage vector, it can be considered that the damage vector is branched at such an end point, and therefore, the branch may be recognized as one aspect of connection.

In the first aspect, examples of the "structure" can include a bridge, a tunnel, a building, and a road, but is not limited thereto.

In the damage information processing device according to a second aspect, in the first aspect, the hierarchical structure information generation unit generates the hierarchical structure information including information on a vector group to which one damage vector belongs, information on another damage vector connected to the one damage vector, and unique information of the one damage vector. The second aspect shows an example of a configuration of the hierarchical structure information, and not only unique information of one damage vector of interest but also information on the vector group and information on another damage vector connected to the one damage vector can be recognized. Thus, in the second aspect, the relationship between damage vectors can be more easily recognized. It should be noted that in the second aspect, the "vector group" is a set of vectors including one or a plurality of damage vectors and, for example, a plurality of damage vectors connected to each other or damage vectors separated from but close to each other can be set as a vector group.

In the damage information processing device according to a third aspect, in the second aspect, the hierarchical structure information generation unit generates the hierarchical structure information in which a plurality of other damage vectors belong to a lower hierarchy than that of the one damage vector in a case where the plurality of other damage vectors is connected to the one damage vector. The third aspect is one example of a scheme of determining the hierarchy of the damage vector. In this aspect, in a case where a plurality of other damage vectors are connected (that is, branched) to one damage vector, the hierarchy becomes lower at the time of each passage of a connection (branch).

In the damage information processing device according to a fourth aspect, in the second aspect, the hierarchical structure information generation unit generates the hierarchical structure information in which the other damage vector belongs to the same hierarchy as that of the one damage vector in a case where an angle between the one damage vector and the other damage vector connected to the one damage vector is equal to or smaller than a threshold value. The fourth aspect shows another example of the scheme of determining the hierarchy of the damage vector. In this aspect, in a case where the angle formed between the damage vectors is small (equal to or smaller than the threshold value) and the vectors can be regarded as being substantially on the same straight line, it is assumed that the damage vectors belong to the same hierarchy.

In the damage information processing device according to a fifth aspect, in the second aspect, the hierarchical structure information generation unit generates the hierarchical structure information in which the other damage vector belongs to the hierarchy lower than that of the one damage vector in a case where the other damage vector connected to the one damage vector is a damage vector occurring later in time than the one damage vector. The fifth aspect shows yet another example of the scheme of determining the hierarchy of the damage vector, damage occurring in the structure generally changes in a shape and size thereof with time, and the damage vector occurring later in time is regarded as belonging to a lower hierarchy in consideration of the fact that a new damage vector is generated. It should be noted that in the fifth aspect, a before-and-after relationship of occurrence of the damage vector can be determined on the basis of, for example, a date and time at which the image of the structure has been captured or a date and time at which the structure has been inspected.

In the damage information processing device according to a sixth aspect, in the second aspect, the hierarchical structure information generation unit generates the hierarchical structure information in which another damage vector belongs to the same hierarchy as that of the one damage vector in a case where there is only the other damage vector connected to the one damage vector. The sixth aspect shows yet another example of the scheme of determining the hierarchy of the damage vector, and in a case where there is only another damage vector connected to one damage vector, the damage vectors are recognized as damage vectors continuous as damage and are regarded as belonging to the same hierarchy.

In the damage information processing device according to a seventh aspect, in any one of the second to sixth aspects, the unique information includes identification information of the one damage vector, affiliation hierarchy information indicating which of hierarchies of the hierarchical structure the one damage vector belongs to, and positions of a start point and a termination point. The seventh aspect shows a configuration of the unique information of the damage vector, and the unique information includes identification information of one damage vector, affiliation hierarchy information, and positions of the start point and the termination point.

In the damage information processing device according to an eighth aspect, in any one of the first to seventh aspects, the hierarchical structure information generation unit generates the hierarchical structure information with the same item and format regardless of the hierarchy to which the damage vector belongs. According to the eighth aspect, since the hierarchical structure information has the same item and format regardless of the hierarchy to which the damage vector belongs, it is possible to rapidly and easily recognize the connection relationship between the damage vectors.

In the damage information processing device according to a ninth aspect, in any one of the first to eighth aspects, the damage vector generation unit connects a plurality of spatially separated damage vectors to generate one or a plurality of vectors. The damage is continuous inside the structure but is separated on a surface thereof. Therefore, in a case where the damage is recognized as a separated damage vector, the damage is actually continuous but may be extracted as a separated vector through image processing or the like. Accordingly, in the ninth aspect, a plurality of damage vectors are connected to generate one or a plurality of vectors. It should be noted that the connection of the damage vectors may be determined on the basis of a condition such as a distance and angle between the damage vectors or may be determined on the basis of the user input.

The damage information processing device according to a tenth aspect further comprises a damage vector extraction unit that extracts a damage vector satisfying a designated condition by referring to the hierarchical structure information in any one of the first to ninth aspects. According to the tenth aspect, it is possible to easily perform search, analysis, and evaluation of the damage by extracting the damage vector by referring to the hierarchical structure information that is information hierarchically representing the connection relationship between the damage vectors.

In the damage information processing device according to an eleventh aspect, in the tenth aspect, the damage vector extraction unit extracts at least one of a damage vector connected to a designated damage vector and belonging to a hierarchy higher than that of the designated vector, a damage vector connected to the designated damage vector and belonging to the same hierarchy as that of the designated vector, and a damage vector connected to the designated damage vector and belonging to a hierarchy lower than that of the designated vector. According to the eleventh aspect, it is possible to rapidly and easily extract damage vectors of a higher, same, or lower hierarchy through connection with the designated damage vector.

The damage information processing device according to a twelfth aspect further comprises a display unit that displays the extracted damage vector and the generated hierarchical structure information in the tenth or eleventh aspect. According to the twelfth aspect, it is possible to easily recognize the connection relationship between the damage vectors and information on the damage vectors by displaying the extracted damage vector and the generated hierarchical structure information.

The damage information processing device according to a thirteenth aspect further comprising a hierarchical structure information recording unit that records the hierarchical structure information in any one of the first to twelfth aspects. The hierarchical structure information recorded in the hierarchical structure information recording unit can be used for the purpose of analysis and/or evaluation of the damage vector.

In the damage information processing device according to a fourteenth aspect, in any one of the first to thirteenth aspects, the damage information acquisition unit performs image processing an image obtained by imaging the structure to acquire the damage information. The fourteenth aspect defines one aspect of a scheme for acquiring the damage information.

In the damage information processing device according to a fifteenth aspect, in any one of the first to fourteenth aspects, the structure is a concrete structure, and the damage includes at least one of cracks and a free lime. The fifteenth aspect defines an example of the structure and the damage.

In order to achieve the above object, a damage information processing method according to a sixteenth aspect of the present invention comprises: a damage information acquisition step of acquiring damage information on damage of a structure; a damage vector generation step of vectorizing the acquired damage information to generate a damage vector; and a hierarchical structure information generation step of generating hierarchical structure information that is information hierarchically representing a connection relationship between the damage vectors on the basis of the generated damage vector. The sixteenth aspect defines the present invention as the damage information processing method, and it is possible to easily recognize the connection relationship between the damage vectors and to easily perform analysis and/or search of the damage vector through the hierarchical structure information, as in the first aspect.

As described above, according to the damage information processing device and the damage information processing method of the present invention, it is possible to easily recognize the connection relationship between the damage vectors.

BRIEF DESCRIPTION OF THE DRAWINGS

FIG. 9 is a table showing image information included in hierarchical structure information.

FIG. 10 is a diagram illustrating an example of damage vector information (corresponding to Example 1 of a hierarchy determination scheme) included in hierarchical structure information.

FIG. 13 is a table showing an example of hierarchical structure information (damage vector information) corresponding to Example 2 of the hierarchy determination scheme.

FIG. 17 is a table showing an example of hierarchical structure information (damage vector information) corresponding to Example 3 of the hierarchy determination scheme;

FIG. 19 is a table showing an example of hierarchical structure information (damage vector information) corresponding to Example 4 of the hierarchy determination scheme.

DESCRIPTION OF THE PREFERRED EMBODIMENTS

Hereinafter, embodiments of a damage information processing device and a damage information processing method according to the present invention will be described with reference to the accompanying drawings.

First Embodiment

Figure 1:
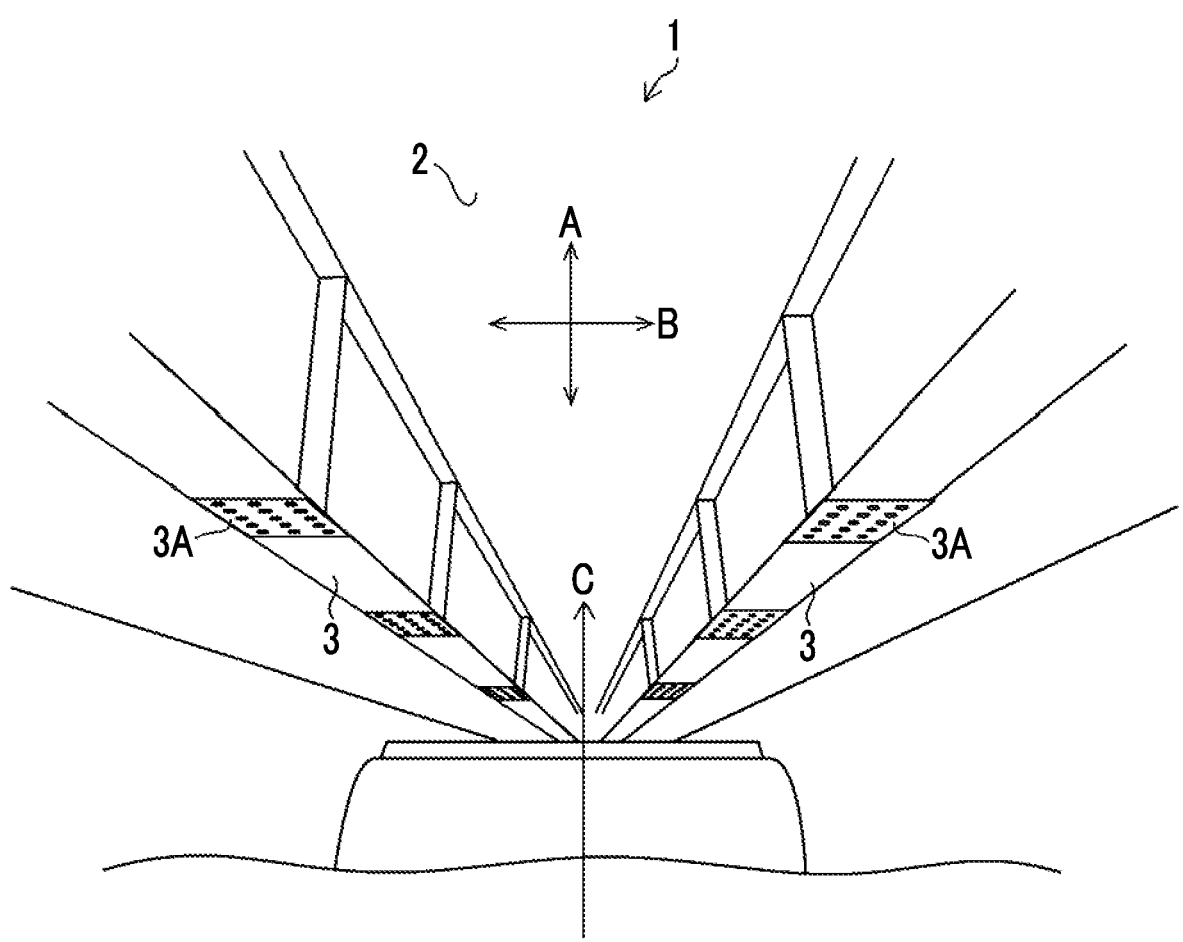
FIG. 1 is a view illustrating a bridge which is an example of a structure.

FIG. 1 is a perspective view illustrating a structure of a bridge 1 (a structure or a concrete structure) which is an example of a structure to which a damage information processing device and a damage information processing method according to the present invention are applied. The bridge 1 illustrated in FIG. 1 includes a main girder 3, and the main girder 3 is bonded to a joint 3A. The main girder 3 is a member that is passed between abutments or piers and supports a load of vehicles or the like on a deck 2. Further, the deck 2 on which vehicles travel is installed in an upper portion of the main girder 3. The deck 2 is assumed to be a deck made of general rebar concrete. It should be noted that the bridge 1 includes members such as a transverse girder, a sway bracing, and a lateral bracing (not illustrated), in addition to the deck 2 and the main girder 3.

Acquisition of Image

In a case where damage of the bridge 1 is inspected, an inspector images the bridge 1 from the lower side (direction C in FIG. 1) using a digital camera 104 (see FIG. 2) and acquires an image for an inspection range. The imaging is performed while appropriately moving in an extending direction (a direction A in FIG. 1) of the bridge 1 and a direction (a direction B in FIG. 1) orthogonal to the extending direction. It should be noted that in a case where it is difficult for the inspector to move due to a surrounding situation of the bridge 1, the digital camera 104 may be installed on a movable body that can move along the bridge 1 and imaging may be performed. Such a movable body may be provided with an elevation mechanism and/or a pan and tilt mechanism for the digital camera 104. It should be noted that examples of the movable body include a vehicle, a robot, and a flying body, but are not limited thereto.

Configuration of Damage Information Processing Device

Figure 2:
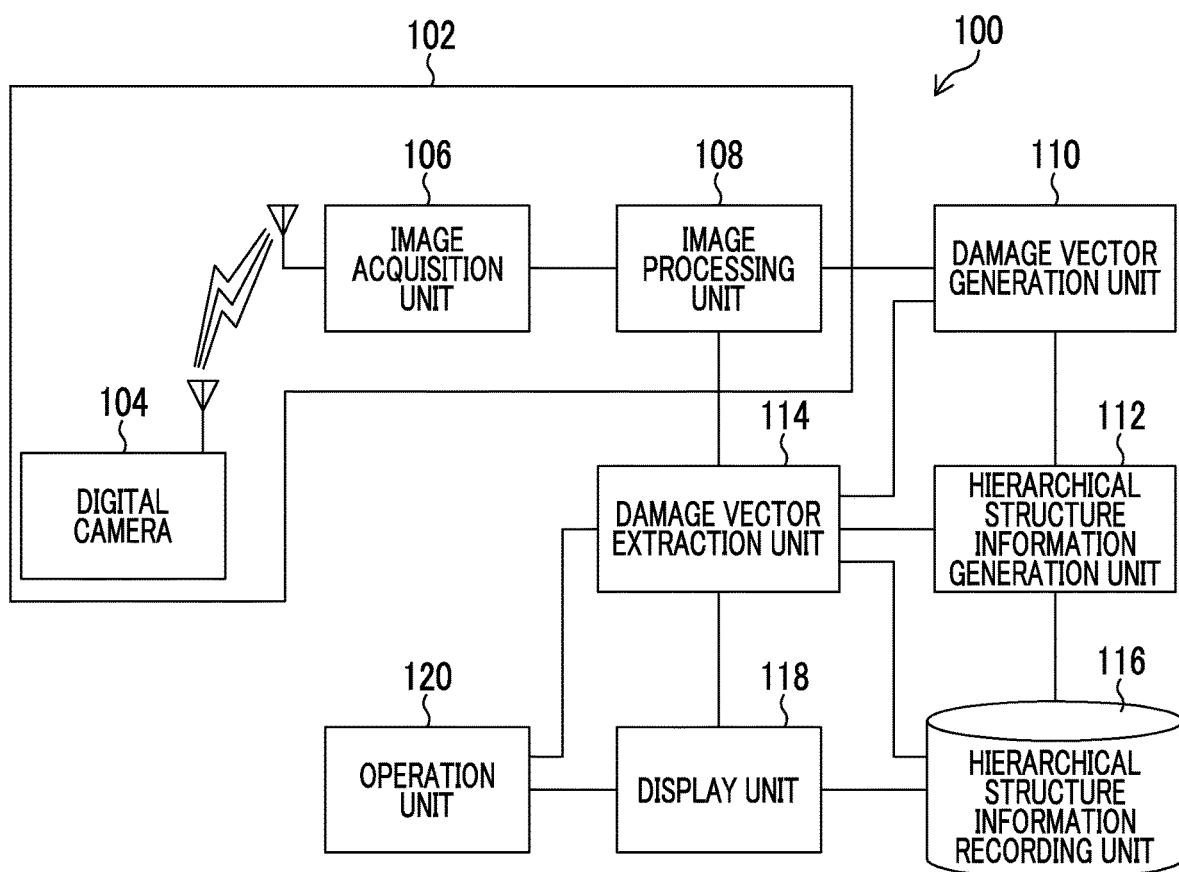
FIG. 2 is a block diagram illustrating a configuration of a damage information processing device according to an embodiment of the present invention.

FIG. 2 is a block diagram illustrating a schematic configuration of a damage information processing device 100 according to the embodiment. The damage information processing device 100 includes a damage information acquisition unit 102, a damage vector generation unit 110, a hierarchical structure information generation unit 112, a damage vector extraction unit 114, a hierarchical structure information recording unit 116, a display unit 118, and an operation unit 120, which are connected to each other so that necessary information can be transmitted or received to or from each other.

A function of each unit can be realized by a control device such as a central processing unit (CPU) executing a program stored in a memory. Further, the damage information acquisition unit 102 includes an antenna for wireless communication and an input and output interface circuit, and the hierarchical structure information recording unit 116 includes a non-transitory recording medium such as a hard disk drive (HDD). Further, the display unit 118 includes a display device such as a liquid crystal display, and the operation unit 120 includes an input device such as a keyboard. It should be noted that these are examples of the configuration of the damage information processing device according to the present invention, and other configurations can be appropriately adopted.

The image captured using the digital camera 104 as described above is input to the image acquisition unit 106 through wireless communication, and the damage information is acquired by the image processing unit 108. The digital camera 104, the image acquisition unit 106, and the image processing unit 108 constitute the damage information acquisition unit 102. The damage vector generation unit 110 generates a damage vector (a crack vector) from the damage information acquired by the damage information acquisition unit 102 and connects the spatially separated damage vectors. The hierarchical structure information generation unit 112 generates hierarchical structure information on the basis of the damage vector occurring by the damage vector generation unit 110, and the generated hierarchical structure information is recorded in the hierarchical structure information recording unit 116. The damage vector extraction unit 114 extracts a damage vector that satisfies a designated condition such as an affiliation hierarchy of the damage vector by referring to the hierarchical structure information. The display unit 118 displays the input image, the generated or extracted damage vector, hierarchical structure information, and the like. The display unit 118 also performs image processing necessary for a display, such as generation of an image of a line segment from information on the damage vector. The operation unit 120 accepts an instruction input from the user regarding a setting of an extraction condition and a display condition for a damage vector and hierarchical structure information, editing of the hierarchical structure information, and the like.

Procedure of Damage Information Processing

Figure 3:
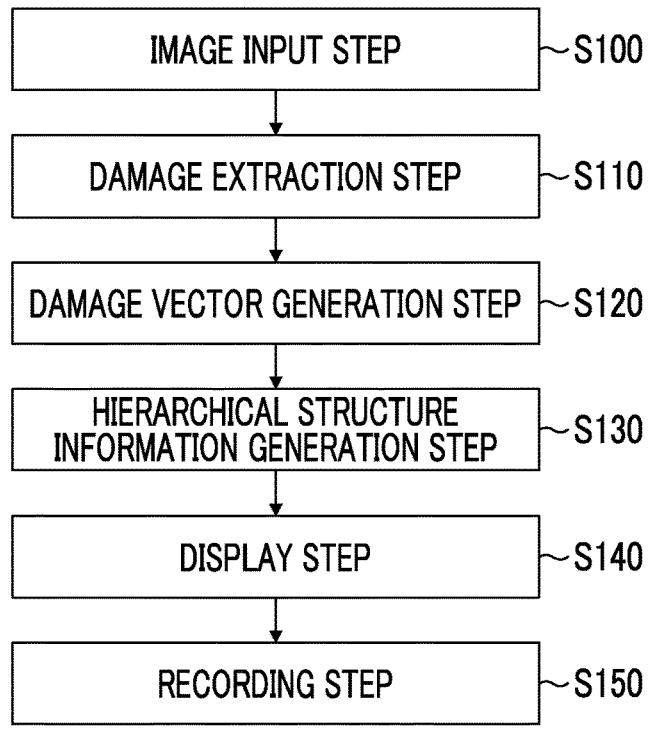
FIG. 3 is a flowchart illustrating a procedure of a damage information processing method according to an embodiment of the present invention.

Next, damage information processing using the damage information processing device 100 having the above-described configuration will be described. FIG. 3 is a flowchart illustrating a procedure of damage information processing according to this embodiment. It should be noted that although a case where damage is a crack generated in the deck 2 will be described and the damage is appropriately described as "crack" in the embodiment, damage to which the present invention can be applied is not limited to the cracks and may be other damage such as free lime.

Damage Information Acquisition Step

First, the image of the bridge 1 imaged by the digital camera 104 as described above is input to the image acquisition unit 106 through wireless communication (step S100; image input step). A plurality of images of the bridge 1 are input according to an inspection range, and information on imaging date and time is added to the input image by the digital camera 104. It should be noted that an imaging date and time of the input image is not necessarily the same in all the images and may be over several days. A plurality of captured images may be collectively input, or one captured image may be input at a time. It should be noted that in the present invention, the "image" of the bridge 1 may be input via a non-transitory recording medium such as various memory cards instead of wireless communication, or data of an image which has already been captured and recorded may be input via the network. It should be noted that the image of the bridge 1 input in step S100 may be the captured image as it is, or pre-processing may be performed on the captured image.

Damage Extraction Step

Next, the image processing unit 108 extracts damage (cracks) from the input image (step S110; damage extraction step). The image input step in step S100 and the damage extraction step in step S110 constitute a damage information acquisition step in the damage information processing method of the present invention. It should be noted that in step S110, in a case where damage is extracted from the image input in step S100, that is, in a case where a damaged area in the image is identified, damage information can be considered to have been acquired, and it is not necessary for detailed damage features to be recognized.

Although the extraction of the damage in step S110 can be performed using various scheme, a crack detection method described in Japanese Patent No. 4006007, for example, can be used. This method is a crack detection method including a step of calculating wavelet coefficients corresponding to two densities to be compared, calculates respective wavelet coefficients in a case where the two densities are changed to create a wavelet coefficient table, and creating a wavelet image by performing wavelet-transformation on an input image obtained by imaging a certain concrete surface that is a crack detection target, and a step of setting wavelet coefficients corresponding to an average density of neighboring pixels in a local region and a density of pixels of interest in the wavelet coefficient table to a threshold value, and comparing the wavelet coefficient of the pixel of interest with the threshold value to determine a crack region and a non-crack region.

In should be noted that the extraction of the damage in step S110 may be performed after necessary pre-processing is performed on the image input in step S100.

Generation of Damage Vector

Figure 4:
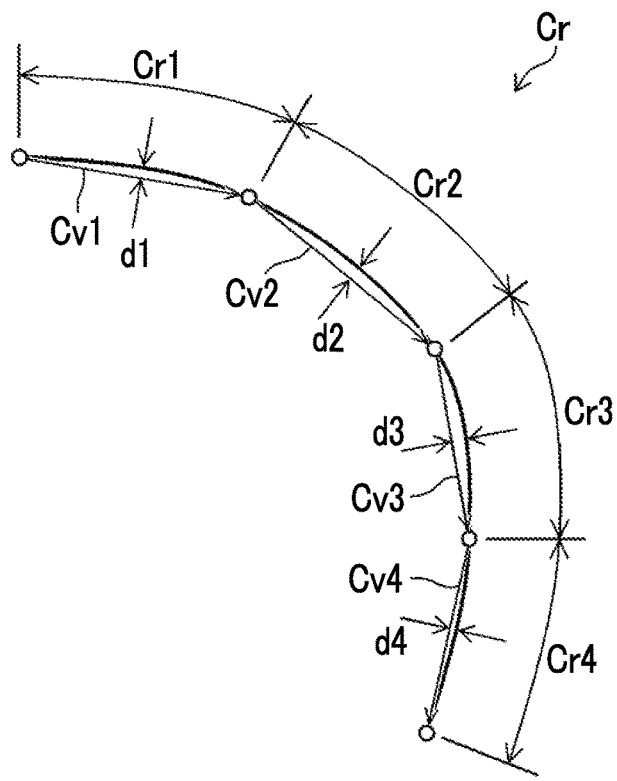
FIG. 4 is a diagram illustrating a state in which a plurality of damage vectors are generated by dividing curved damage.

In a case where the damage is extracted (damage information is acquired) in step S110, the damage vector generation unit 110 vectorizes the acquired damage information to generate a damage vector (a crack vector) (step S120; damage vector generation step). In a case where vectorization is performed, the extracted damage (cracks) is binarized and/or thinned, as necessary. It should be noted that the "Vectorization" is to find a line segment that is determined by a start point and a termination point with respect to the damage, and in a case where the damage (cracks) is curved, the damage is divided into a plurality of sections so that a distance between a curve and a line segment is equal to or smaller than a threshold value, and a damage vector is generated for each of the plurality of sections. In the example of FIG. 4, the curved damage Cr is divided into four sections Cr1 to Cr4, and damage vectors Cv1 to Cv4 are generated for the respective sections, so that distances d1 to d4 between the damage and the damage vectors Cv1 to Cv4 in the sections Cr1 to Cr4 are set to be equal to or smaller than the threshold value.

Figure 5:
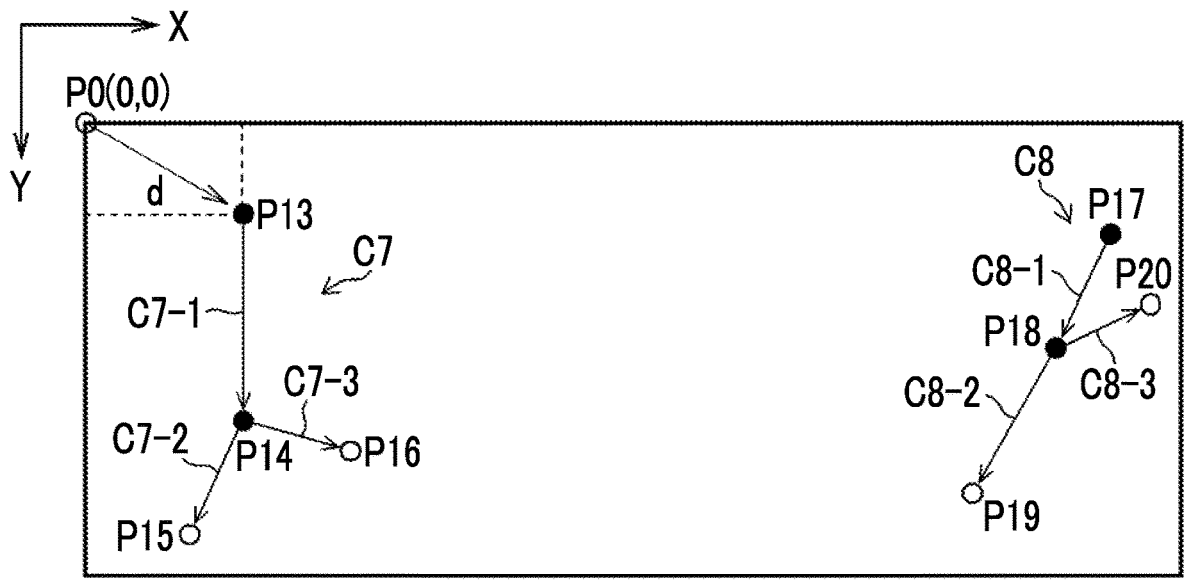
FIG. 5 is a diagram illustrating a state in which a start point of a damage vector is determined.

When the damage vector is generated, for example, a feature point of the deck 2 is set as an origin of a coordinate system, an end point at which a distance from the origin is minimized is set to a first start point for the group of damage vectors (vector group), and then, a start point and a termination point can be sequentially determined in a traveling direction of the damage vector. In the example of FIG. 5, in a case where a point P0 on the deck 2 is the origin of the coordinate system, and a right direction and a downward direction in FIG. 5 are an X-axis direction and a Y-axis direction of the coordinate system, a points P13 at which the distance d from the point P0 is the shortest among points P13, P14, P15, and P16 of the vector group C7 can be set as a start point of a damage vector C7-1, the point P14 can be set as a termination point of the damage vector C7-1 (and a start point of the damage vectors C7-2 and C7-3), and then, the points P15 and P16 can be set as a termination point of the damage vectors C7-2 and C7-3.

Figure 6:
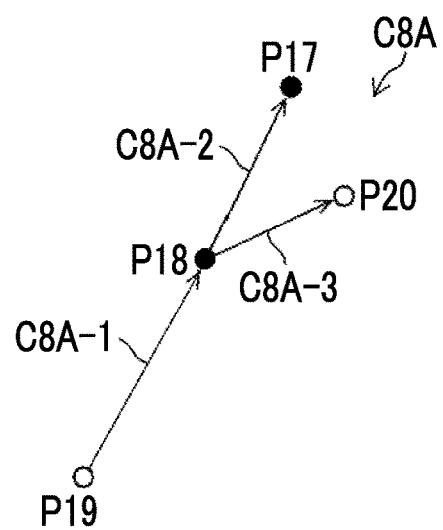
FIG. 6 is a diagram illustrating a state in which a start point of a damage vector is determined.

However, in a case where a start point of a vector group C8 is determined using the same scheme, a point P17 is a start point of a damage vector C8-1, a point P18 is a start point of damage vectors C8-2 and C8-3, and a traveling direction of the damage vector C8-3 (a direction from the point P18 to the point P20) is opposite to a traveling direction of the damage vector C8-1. Therefore, in such a case, as illustrated in FIG. 6, a point P19 may be set as a start point of a damage vector C8A-1, a point P18 may be set as a termination point of the damage vector C8A-1 (and a start point of damage vectors C8A-2 and C8A-3), and points P17 and P20 may be set as termination points of the damage vectors C8A-2 and C8A-3, respectively. It should be noted that a set of damage vectors in this case is indicated as a vector group C8A. Such a process may be performed by the damage vector generation unit 110 without an instruction input from the user or may be performed by the damage vector generation unit 110 on the basis of the instruction input from the user via the operation unit 120.

Connection of Separated Damage Vectors

In a case where the damage vector is generated as described above, in a case where the damage is continuous within the deck 2, but separated on the surface, the damage vector is likely to be recognized as a separate damage vector. Therefore, in the damage information processing device 100 according to the embodiment, one or a plurality of vectors are generated by connecting such a plurality of damage vectors.

Figure 7:
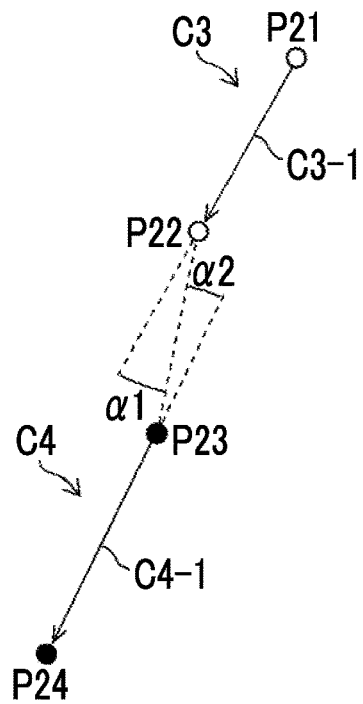
FIG. 7 is a diagram illustrating a connection of separated damage vectors.
Figure 8:
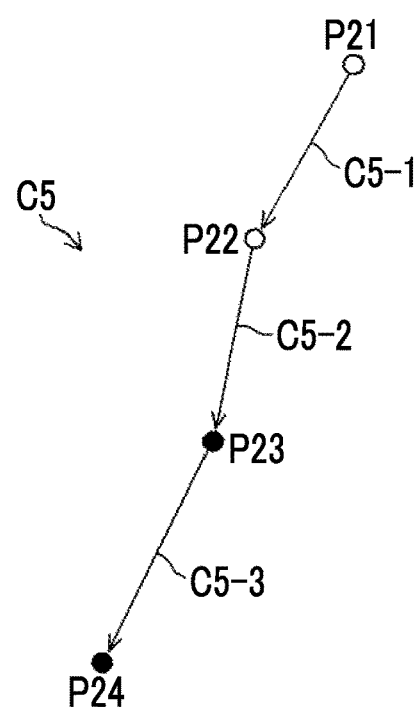
FIG. 8 is another view illustrating the connection of the separated damage vectors.

FIG. 7 is a diagram illustrating an example of connection of damage vectors and illustrates a situation in which a vector group C3 including a damage vector C3-1 (a point P21 and a point P22 are a start point and a termination point, respectively) and a vector group C4 including a damage vector C4-1 (a point P23 and a point P24 are a start point and a termination point, respectively) have been extracted. Further, an angle formed between the damage vector C3-1 and a line segment connecting the points P22 and P23 is α1, and an angle between the damage vector C4-1 and the line segment connecting the points P22 and P23 is α2. In this case, in a case where both the angle α1 and the angle α2 are equal to or smaller than a threshold value, the damage vectors C3-1 and C4-1 are connected to each other and the vector groups C3 and C4 are merged. More specifically, as illustrated in FIG. 8, a new damage vector C5-2 is generated and connected to other damage vectors C5-1 (which is the same as the damage vector C3-1) and C5-3 (which is the same as the damage vector C4-1), and a new vector group including the damage vectors C5-1, C5-2, and C5-3 is set as a vector group C5.

It should be noted that the above-described scheme is an example of a damage vector connection scheme, and other methods may be used. The determination may be made as to whether or not to connect the damage vectors as described above by the damage vector generation unit 110 without depending on the instruction input from the user or may be made as to whether or not to connect the damage vectors as described above by the damage vector generation unit 110 on the basis of the instruction input from the user via the operation unit 120.

Thus, in the damage information processing device 100 according to the embodiment, it is possible to accurately recognize a connection relationship between the damage vectors by appropriately connecting the damage vectors separated spatially (on the surface of the deck 2).

Generation of Hierarchical Structure Information

In a case where the damage vector is generated in step S120, the hierarchical structure information generation unit 112 generates hierarchical structure information on the basis of the generated damage vector (step S130; hierarchical structure information generation step). The hierarchical structure information is hierarchy information representing a connection relationship between the damage vectors, and includes the image information (see FIG. 9) and the damage vector information (see FIGS. 10, 13, 17, and 19). The image information and the damage vector information are associated via a vector group which is a set of damage vectors (crack vectors). Therefore, it is also possible to extract the damage vector by referring to identification (ID) of the vector group from the damage image, and conversely extract the image on the basis of the damage vector. Since the hierarchical structure information is generated in the same item and format regardless of a hierarchy (a level) to which the damage vector belongs (see FIGS. 10, 13, 17, and 19), the user can easily recognize the hierarchical structure information.

Image Information

The above-described image information is information on the captured image in which the damage is captured, and information in which identification information (ID) and image data of the captured image, a date and time of image acquisition, and the like are defined for a group of damage vectors. FIG. 9 is a table showing an example of image information, in which an ID of an image, image data, a date and time of acquisition, a width and a height of the image, the number of channels, bits/pixel, and resolution have been defined for the vector group C1 (see FIG. 11). The number of channels is three for RGB (R: red, G: green, B: blue) color images, and is one for monochrome images. It should be noted that only the vector group C1 is described in FIG. 9, but the same information is generated for each group in a case where there are a plurality of vector groups.

Damage Vector Information

FIG. 10 illustrates an example of the damage vector information. The damage vector information includes information on a vector group to which the damage vector belongs, unique information of each damage vector, information on another damage vector connected to each damage vector in the vector group, and additional information.

The information on the vector group (vector group C1 in the case of the table of FIG. 10; see FIG. 11) includes an ID of the group. Unique information of the damage vector includes an identification information (ID) of the damage vector, a hierarchy (level: affiliation hierarchy information), a start point and a termination point (a point number and position coordinates), and a length. Here, in the hierarchy (level), level 1 is the highest level (level), and a larger number indicates a lower hierarchy. Details of a specific hierarchy determination method will be described below. The information on other damage vectors includes identification information (ID) of a parent vector, a sibling vector, and a child vector, as described below. The additional information includes a width of the damage, a deletion operation flag, an addition operation flag, an inspection date, and a repair information.

Parent Vector, Sibling Vector, and Child Vector

In the embodiment, in a case where a termination point of one damage vector is a start point of another damage vector, the one damage vector is referred to as "a parent vector", and the other damage vector is referred to as a "child vector". It is assumed that the number of parent vectors is determined to be zero or one for one damage vector, but there may be any number of child vectors equal to or greater than zero for one parent vector. Also, in a case where the termination point of the parent vector is a start point of a plurality of child vectors, the plurality of child vectors are referred to as "sibling vectors". There may be any number of sibling vectors equal to or greater than zero.

As described above, in the embodiment, identification information (IDs) of the parent vector, the sibling vector, and the child vector are included in the hierarchical structure information, and therefore, the parent vector, the sibling vectors, and the child vectors can be sequentially specified by referring to the IDs of the vectors on the basis of any damage vector. For example, it is possible to specify a parent vector of a certain damage vector and further specify a child vector of that parent vector. Thus, in the damage information processing device 100 according to the embodiment, it is possible to easily recognize the connection relationship between the damage vectors and to easily perform analysis and search of the damage vectors.

Additional Information

The "width" included in the additional information indicates the width of the cracks corresponding to each damage vector. The deletion operation flag indicates whether or not the vector is a vector on which a deletion operation has been performed, and is "1" in a case where the deletion operation has been performed and "0" in a case where the deletion operation has not been performed. By referring to this deletion operation flag, it is possible to switch between display and non-display of the damage vector. The addition operation flag is related to a detection aspect of the damage vector, and is "0" in a case in a case where the vector is an automatically detected vector, "1" in a case where the vector is a vector added manually (by an instruction input from the user), and "2" in a case where the vector is a vector added manually and generated by connecting vectors of different IDs.

A date on which the damaged image has been captured taken is set in in "Inspection date", but the date can be edited by an instruction input from the user via the operation unit 120. Further, information on "Repair" can be generated on the basis of the instruction input (a type of repair and a repair date) from the user via the operation unit 120. Examples of the type of repair include filling with cement, filling with resin, and leaving (follow-up observation) (described as R1, R2, and R3 respectively in the table of FIG. 10).

Hierarchy of Damage Vector

Next, a hierarchy (level) to which the damage vector belongs will be described. The hierarchy of the damage vector can be determined using various schemes, for example, as described in Examples 1 to 4 below.

Hierarchy Determination Scheme (Example 1)

Figure 11:
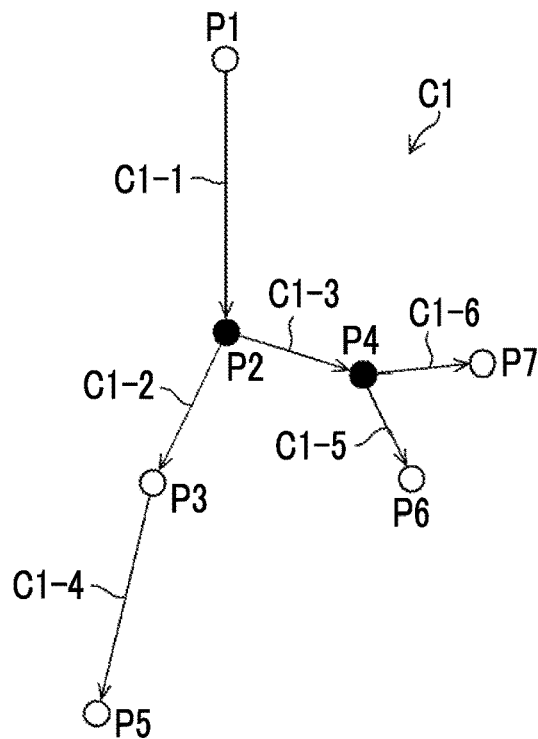
FIG. 11 is a diagram illustrating Example 1 of the hierarchy determination scheme for a damage vector.

FIG. 11 is a diagram illustrating the vector group C1. The vector group C1 includes damage vectors C1-1 to C1-6, and the damage vectors have points P1 to P7 as start points or termination points. Under such a situation, in Example 1, it is assumed that the hierarchy becomes lower each time the damage vector branches (a termination point of a certain damage vector is a start point of a plurality of other damage vectors). Specifically, the hierarchy of the damage vector C1-1 is set as the highest "level 1", and a hierarchy of damage vectors C1-2 and C1-3 in which the point P2 serving as the termination point of the damage vector C1-1 is set as the start point is set to be at "level 2" which is lower than the damage vector C1-1. Similarly, a hierarchy of the damage vectors C1-5 and C1-6 in which point P4 which is the termination point of the damage vector C1-3 is set as a start point is set to be at "level 3" which is lower than the damage vector C1-3. On the other hand, since the point P3 which is the termination point of the damage vector C1-2 is set as the start point of the damage vector C1-4, but the damage vector in which the point P3 is the start point is only the damage vector C1-4 and there is no branch, the hierarchy of the damage vector C1-4 is set to be at "level 2" that is the same as that of C1-2. The hierarchy of each damage vector determined in this way is included in the hierarchical structure information as shown in the table of FIG. 10.

Hierarchy Determination Scheme (Example 2)

Figure 12:
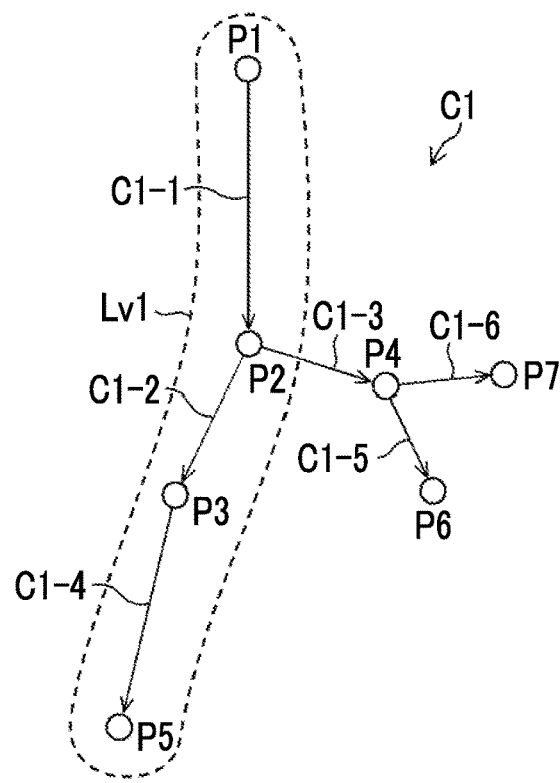
FIG. 12 is a diagram illustrating Example 2 of the hierarchy determination scheme for a damage vector.

FIG. 12 is a diagram illustrating a vector group C1 (a connection relationship between damage vectors is the same as that illustrated in FIG. 11). In Example 2, it is assumed that one of the damage vectors to be connected of which an angle formed with respect to another damage vector is equal to or smaller than the threshold value (a damage vector corresponding to a "trunk" in a tree structure) belong to the same hierarchy. Specifically, damage vectors C1-1, C1-2, and C1-4 present within a dotted line (a range indicated by a reference symbol Lv1) in FIG. 12 are set to "level 1" (the highest level) which is the same hierarchy. Further, for other damage vectors C1-3, C1-5, and C1-6, the hierarchy becomes lowered each time the damage vector branches as in Example 1, the damage vector C1-3 (corresponding to a "branch" in a tree structure) is set to a "level 2", and the damage vectors C1-5 and C1-6 (corresponding to "leaves" in the tree structure) are set to "level 3". The hierarchy and the type (a trunk, a branch, or a leaf) of each damage vector determined in this way are included in the hierarchical structure information as shown in the table of FIG. 13.

Hierarchy Determination Scheme (Modification Example of Example 2)

A modification example of the above-described hierarchy determination scheme (example 2) will be described. As in the hierarchy determination scheme (Example 2), in a case where the hierarchy is determined on the assumption that the damage vector corresponds to a trunk, a branch, and a leaf in a tree structure, it is generally considered that the "branch" is shorter than the "trunk", and therefore, the hierarchy may be determined by setting the longest damage vector as a "truck" (level 1) and other damage vectors as "branches" or "leaves". In this case, for example, in the damage vector information shown in the table of FIG. 13, the damage vector C1-1 having a length of 100 mm becomes "trunk" (level 1). The damage vectors C1-2 and C1-3 can be set as "branches" (level 2), the damage vectors C1-4 can be set as "branches" (level 2) or "leaves" (level 3), and the damage vectors C1-5 and 6 can be set as "leaves" (level 3).

It should be noted that the damage vector constituting "longest cracks" rather than the "longest damage vector" may be set as a "trunk" (level 1), and the damage vectors corresponding to the cracks branching from the "trunk" may be set as "branches" or "leaves". In this case, the "longest crack" is assumed to mean that "in a case where a thick crack and a thin crack are both connected, the crack is longest".

Also, a type (a trunk, a branch, and a leaf) and a hierarchy may be determined in consideration of a width (a width of the damage corresponding to the damage vector) in addition to a length of the damage vector. For example, the hierarchy may be determined by setting the damage vector of which "length×width" is maximized as a "trunk" and setting the other damage vector as a "branch" or a "leaf". In this case, for example, in the damage vector information shown in the table of FIG. 13, the damage vector C1-1 with "length× width" being the maximum (100 mm$^2$) is "trunk". The damage vectors C1-2 and C1-3 can be set as "branches" (level 2), damage vector C1-4 can be set as a "branch" (level 2), or a "leave" (level 3), and the damage vectors C1-5 and 6 can be set as "Leaves" (level 3).

It is possible to improve accuracy of hierarchization by determining the hierarchy of the damage vector in consideration of the length of the damage vector or "length× width", as in the above-described modification example.

Hierarchy Determination Scheme (Example 3)

Figure 14:
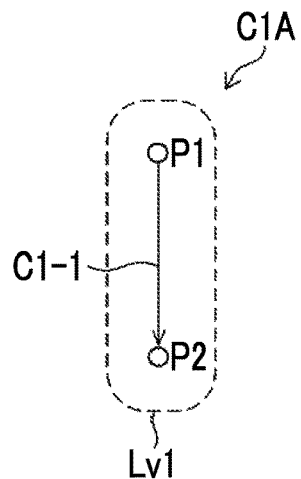
FIG. 14 is a diagram illustrating Example 3 of the hierarchy determination scheme for a damage vector.
Figure 15:
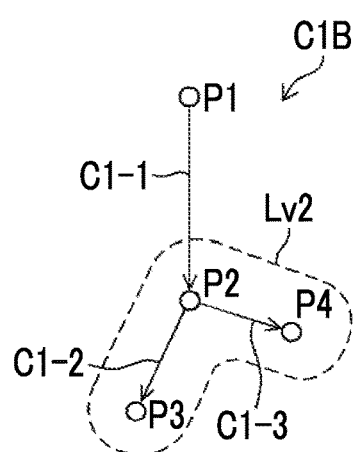
FIG. 15 is another diagram illustrating Example 3 of the hierarchy determination scheme for a damage vector, and is a diagram illustrating an image captured later in time than in FIG. 14.
Figure 16:
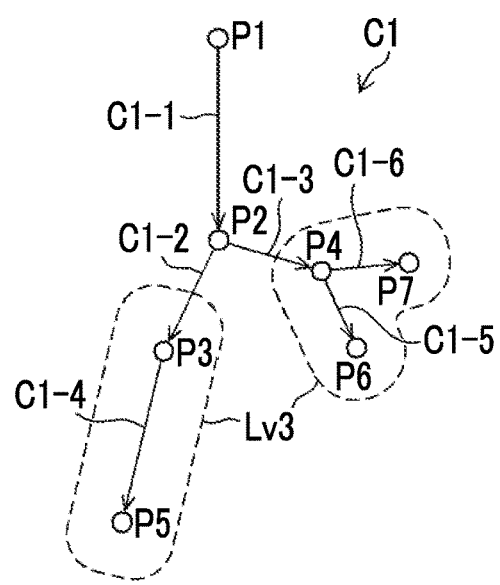
FIG. 16 is yet another diagram illustrating Example 3 of the hierarchy determination scheme for a damage vector, and is a diagram illustrating an image captured later in time than in FIG. 15.

FIGS. 14 to 16 are diagrams illustrating the vector group C1 (a connection relationship between damage vectors is the same as those illustrated in FIGS. 11 and 12). In Example 3, a time before and after occurrence of the damage vector is determined on the basis of the imaging date and time for the image of the bridge 1, and as the damage vector occurs later in time, the damage vector belongs to the lower hierarchy. In the case of FIGS. 14 to 16, the vector group C1A including the damage vector C1-1 is generated in the first captured image (FIG. 14), the damage vectors C1-2 and C1-3 are newly generated and form a vector group C1B in the next captured image (FIG. 15), and damage vectors C1-4, C1-5, and C1-6 are further generated and form the vector group C1 in the last captured image (FIG. 16).

In such a situation, in Example 3, the damage vector C1-1 (a range indicated by a reference numeral Lv1 in FIG. 14) occurring in the first image is at the highest "level 1", the damage vectors C1-2 and C1-3 occurring in the next image (a range indicated by a reference symbol Lv2 in FIG. 15) are at "level 2", and the damage vectors C1-4, C1-5, and C1-6 occurring in the last image (a range indicated by a reference symbol Lv3 in FIG. 16) is at "level 3".

The hierarchy of each damage vector determined in this way is included in the hierarchical structure information as shown in the table of FIG. 17.

Hierarchy Determination Scheme (Example 4)

Figure 18:
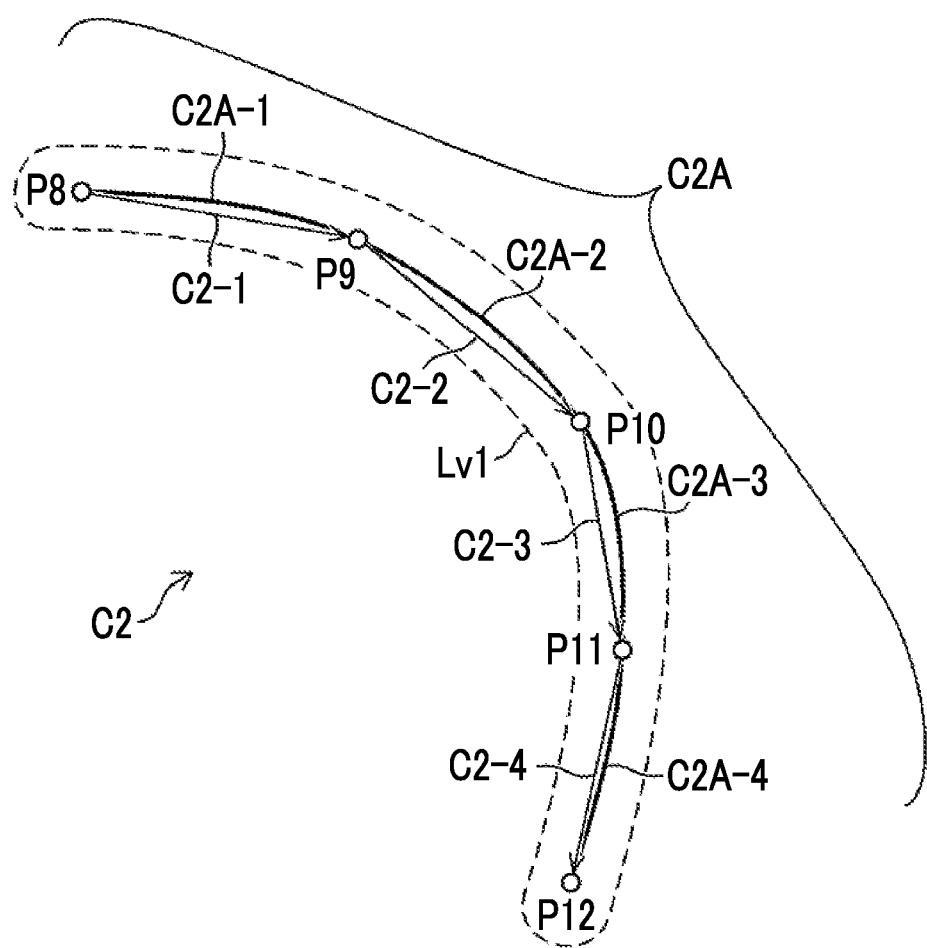
FIG. 18 is a diagram illustrating Example 4 of the hierarchy determination scheme for a damage vector.

FIG. 18 is a diagram illustrating a crack C2A and a corresponding vector group C2. In Example 4, in a case where there is only another damage vector connected to one damage vector, it is assumed that such other damage vector belongs to the same hierarchy as the one damage vector. More specifically, a case where one curved crack C2A is divided into a plurality of cracks C2A-1 to C2A-4, and the cracks correspond to damage vectors C2-1 to C2-4 having points P8 to P12 as start points or termination points, respectively, as illustrated in FIG. 18, is considered, only one damage vector (damage vectors C2-2 to C2-4) is connected to a termination point of the damage vectors C2-1 to C2-3. In such a case, in Example 4, the damage vectors C2-1 to C2-4 (a range indicated by reference symbol Lv1 in FIG. 18) are considered to be substantially one damage vector and are all assumed to belong to "level 1" (the highest level) that is the same hierarchy.

The hierarchy of each damage vector determined in this way is included in the hierarchical structure information as shown in the table of FIG. 19.

Although Examples 1 to 4 of the affiliation hierarchy determination scheme of the damage vector have been described above, the schemes can be appropriately used according to a specific aspect of damage and a plurality of schemes may be used in combination, as necessary. For example, for a group of damage vectors having a complex connection pattern, the hierarchy may be determined for a certain part using Example 1, and the hierarchy may be determined for another part using Example 4. Such a combination of the hierarchy scheme may be determined and performed by the hierarchical structure information generation unit 112 or may be performed on the basis of an instruction input from the user via the operation unit 120.

Item and Format of Hierarchical Structure Information

In the embodiment, as shown in the tables of FIGS. 10, 13, 17, and 19, since the hierarchical structure information has the same item and format regardless of the hierarchy to which the damage vector belongs, a connection relationship between damage vectors can be recognized rapidly and easily.

Extraction of Damage Vectors

Next, extraction of damage vectors will be described. In the embodiment, since the hierarchical structure information includes, for example, a vector group to which the damage vector belongs, an identification number (ID) of the damage vector, an affiliation hierarchy, and IDs of other damage vectors (a parent vector, a sibling vector, and a child vector) to be connected (see FIGS. 10, 13, 17, and 19), it is possible to designate a desired condition for the items and extract the damage vector. Examples of the condition to be designated can include "a hierarchy to which a damage vector belongs"

and "a vector in which a specific vector is set as a parent vector, a sibling vector, or a child vector", but the condition that can be designated is not limited to such examples.

For example, in the case of the damage vector information illustrated in FIG. 10, in a case where "a hierarchy (level) of the damage vector is at level 2" is designated as the condition, the damage vectors C1-2, C1-3, and C1-4 are extracted by referring to a column "hierarchy (level)" of the hierarchical structure information, and in a case where "a damage vector connected to the damage vector C1-2 and belonging to a hierarchy higher than the damage vector C1-2" is designated as the condition, the damage vector C1-1 (the parent vector) is extracted. Further, in a case where "a damage vector connected to the damage vector C1-2 and belonging to a hierarchy that is the same as that of the damage vector C1-2" is designated as the condition, the damage vector C1-3 (the sibling vector) and the damage vector C1-4 (the child vector) are extracted, and in a case where "a damage vector connected to the damage vector C1-3 and belonging to a hierarchy lower than that of the damage vector C1-3" is designated as the condition, the damage vectors C1-5 and C1-6 (the child vectors) are extracted. The damage vector extraction unit 114 can perform such extraction of the damage vectors by referring to the hierarchical structure information recording unit 116 on the basis of an instruction input from the user via the operation unit 120.

Thus, in the damage information processing device 100 according to the embodiment, it is possible to easily perform the search, the analysis, and the evaluation of the damage vectors. It should be noted that the extracted damage vector can be displayed in the format of individual information and/or line drawing (to be described below).

Display of Damage Vector and Hierarchical Structure Information

In step S140, the hierarchical structure information generated in step 130 is displayed on the display unit 118 (a display step). The display of the hierarchical structure information can be performed in the format of tables illustrated in FIG. 9, 10, 13, 17, or 19 or can be performed using information on a part extracted from the tables. One example of such "information on a part" may include "information on damage vectors extracted under a designated condition" and "information on a specific item such as an inspection date and/or a repair date".

In addition, a line drawing indicating the damage vector may be drawn on the basis of the hierarchical structure information and displayed on the display unit 118. As shown in the tables of FIGS. 10, 13, 17, and 19, since the hierarchical structure information includes information on the start point and the termination point of the damage vector, and information on another damage vector to be connected, line drawings (for example, see FIGS. 11, 12, and 14 to 16) indicating the damage vectors can be drawn on the basis of such information and displayed. An arrow may be attached to the line drawing showing the damage vector so that the direction of the damage vector (the direction from the start point to the termination point) can be identified (see FIGS. 11, 12, and 14 to 16). In a case where the line drawing of the damage vector is drawn and displayed, all damage vectors included in the hierarchical structure information may be drawn and displayed, or only some (for example, damage vectors extracted under the conditions designated as described above) of the damage vectors may be displayed.

It should be noted that in a case where the line drawing indicating the damage vector is displayed, display conditions such as color, a thickness, and a line type (solid line, dotted line, or the like) of the damage vector are changed according to specific information among the information included in the hierarchical structure information. Examples of such information can include a hierarchy (level), a type (trunk, branch, and leaf), and an occurrence date and time of the damage vector, a deletion operation flag, and a value of an addition operation flag, and may be appropriately set from among items included in the hierarchical structure information. By performing the display in an aspect according to features of the damage vector in this way, it is possible to easily recognize the connection relationship between damage vectors and/or the state of temporal change.

Any one of the line drawing of the damage vector and the hierarchical structure information may be displayed, or both of the line drawing of the damage vector and the hierarchical structure information may be displayed at the same time. Further, an image obtained by imaging damage (cracks) in the above-described display (for example, an image "img_2015-001" shown in the table of FIG. 9) may be displayed to be superimposed on or side by side with the line drawing of the damage vector such that the image and the line drawing can be compared (see, for example, FIG. 18).

In this embodiment, since the damage vector and/or the hierarchical structure information is displayed in this way, it is possible to easily recognize the damage vector information and the connection relationship between the damage vectors.

Recording of Damage Vector and Hierarchical Structure Information

In step S150, the hierarchical structure information is recorded in the hierarchical structure information recording unit 116 (a recording step). The hierarchical structure information recorded in the hierarchical structure information recording unit 116 can be used for purposes such as analysis and evaluation of the damage. It should be noted that, in a case where some information (for example, the damage vector satisfying the designated condition) is extracted from the hierarchical structure information, the information extracted in this way is all included in the original hierarchical structure information, and therefore, an extraction result is not necessarily recorded, but recording of the extraction result in the hierarchical structure information recording unit 116 enables the extraction result to be rapidly referred to, as necessary.

Correction of Hierarchical Structure Information

As described above, in the embodiment, the hierarchical structure information generation unit 112 generates the hierarchical structure information, but the hierarchical structure information generation unit 112 can correct the hierarchical structure information on the basis of the instruction input from the user via the operation unit 120.

As described above, according to the damage information processing device 100 and the damage information processing method according to the embodiment, it is possible to easily recognize the connection relationship between the damage vectors and to easily perform the analysis and/or search of the damage vectors on the basis of the hierarchical structure information.

Although the examples of the present invention have been described above, the present invention is not limited to the above-described embodiments and modification examples and various modifications are possible without departing from the spirit of the present invention.

EXPLANATION OF REFERENCES

1: bridge
2: deck
3: main girder
3A: joint
100: damage information processing device
102: damage information acquisition unit
104: digital camera
106: image acquisition unit
108: image processing unit
110: damage vector generation unit
112: hierarchical structure information generation unit
114: damage vector extraction unit
116: hierarchical structure information recording unit
118: display unit
120: operation unit

What is claimed is:

1. A damage information processing device comprising:
a processor configured to:
acquire damage information on damage of a structure;
vectorize the acquired damage information to generate a plurality of damage vectors; and
generate hierarchical structure information on a basis of the generated plurality of damage vectors, the hierarchical structure information being information hierarchically representing a connection relationship between two or more of the plurality of damage vectors, wherein
the processor is configured to generate the hierarchical structure information including information on a vector group to which one damage vector belongs, information on a second damage vector connected to the one damage vector, and unique information of the one damage vector, and wherein the unique information includes identification information of the one damage vector, affiliation hierarchy information indicating which hierarchies of the hierarchical structure information the one damage vector belongs to, and positions of a start point and a termination point.

2. The damage information processing device according to claim 1, wherein
the processor is configured to generate the hierarchical structure information in which a plurality of other damage vectors belong to a lower hierarchy than that of the one damage vector in a case where the plurality of other damage vectors is connected to the one damage vector.

3. The damage information processing device according to claim 1, wherein
the processor is configured to generate the hierarchical structure information in which the second damage vector belongs to a same hierarchy as that of the one damage vector in a case where an angle between the one damage vector and the second damage vector connected to the one damage vector is equal to or smaller than a threshold value.

4. The damage information processing device according to claim 1, wherein
the processor is configured to:
acquire an image of the structure including information on an imaging date and time thereof, as the damage information, and generate the hierarchical structure information in which the second damage vector belongs to a hierarchy lower than that of the one damage vector in a case where it is determined that the second damage vector connected to the one damage vector corresponds to damage occurring later in time than damage corresponding to the one damage vector, on the basis of the information on the imaging date and time.

5. The damage information processing device according to claim 1, wherein
the processor is configured to generate the hierarchical structure information in which the second damage vector belongs to a same hierarchy as that of the one damage vector in a case where there is only the second damage vector connected to the one damage vector.

6. The damage information processing device according to claim 1, wherein
the processor is configured to generate the hierarchical structure information with same item and format regardless of a hierarchy to which the one damage vector or the second damage vector belongs.

7. The damage information processing device according to claim 1, wherein
the processor is configured to connect a plurality of spatially separated damage vectors to generate one or a plurality of vectors.

8. The damage information processing device according to claim 1, wherein
the processor is configured to extract a damage vector satisfying a designated condition by referring to the hierarchical structure information.

9. The damage information processing device according to claim 8, wherein
the processor is configured to extract a damage vector connected to a designated damage vector and belonging to a hierarchy higher than that of the designated damage vector, a damage vector connected to the designated damage vector and belonging to a same hierarchy as that of the designated damage vector, and a damage vector connected to the designated damage vector and belonging to a hierarchy lower than that of the designated damage vector.

10. The damage information processing device according to claim 8, further comprising a display unit that displays the extracted damage vector and the hierarchical structure information.

11. The damage information processing device according to claim 1, further comprising a processor that records the hierarchical structure information.

12. The damage information processing device according to claim 1, wherein
the processor performs image processing on an image obtained by imaging the structure to acquire the damage information.

13. The damage information processing device according to claim 1, wherein
the structure is a concrete structure, and the damage includes at least one of cracks and a free lime.

14. A damage information processing method comprising:
acquiring damage information on damage of a structure;
vectorizing the acquired damage information to generate a plurality of damage vectors; and
generating hierarchical structure information that is information hierarchically representing a connection relationship between the plurality of damage vectors on a basis of the generated damage vector, wherein generating the hierarchical structure information includes information on a vector group to which one damage vector belongs, information on a second damage vector connected to the one damage vector, and unique information of the one damage vector, and
the unique information includes identification information of the one damage vector, affiliation hierarchy information indicating which hierarchies of the hierarchical structure information the one damage vector belongs to, and positions of a start point and a termination point.

* * * * *